(12) United States Patent
Melo

(10) Patent No.: US 10,934,820 B2
(45) Date of Patent: Mar. 2, 2021

(54) FLOW METER WELL TOOL

(71) Applicant: Saudi Arabian Oil Company, Dhahran (SA)

(72) Inventor: Rafael Adolfo Lastra Melo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/741,066

(22) Filed: Jan. 13, 2020

(65) Prior Publication Data

US 2020/0149377 A1    May 14, 2020

Related U.S. Application Data

(62) Division of application No. 15/961,993, filed on Apr. 25, 2018, now Pat. No. 10,557,334, which is a division of application No. 14/330,785, filed on Jul. 14, 2014, now Pat. No. 9,982,519.

(51) Int. Cl.
```
E21B 43/12      (2006.01)
E21B 47/10      (2012.01)
G01F 1/44       (2006.01)
```
(52) U.S. Cl.
CPC .......... *E21B 43/128* (2013.01); *E21B 47/10* (2013.01); *G01F 1/44* (2013.01)

(58) Field of Classification Search
CPC ........ E21B 43/128; E21B 49/08; E21B 47/00; E21B 47/10; G01F 1/44
USPC ............................................. 702/2, 6, 11, 12
See application file for complete search history.

(56) References Cited

U.S. PATENT DOCUMENTS

| | | | |
|---|---|---|---|
| 5,036,710 | A | 8/1991 | King |
| 5,042,297 | A | 8/1991 | Lessi |
| 5,150,750 | A | 9/1992 | Lessi et al. |
| 5,693,891 | A | 12/1997 | Brown et al. |
| 5,736,650 | A | 4/1998 | Hiron et al. |
| 5,887,657 | A | 3/1999 | Bussear |
| 6,688,860 | B2 | 2/2004 | Du et al. |
| 6,829,947 | B2 | 12/2004 | Han |

(Continued)

FOREIGN PATENT DOCUMENTS

| | | |
|---|---|---|
| JP | 2002513141 | 5/2002 |
| JP | 2002286514 | 10/2002 |

(Continued)

OTHER PUBLICATIONS

Gulf Cooperation Council Examination Report issued in GCC Application GC 2015-29767 dated May 19, 2020, 4 pages.

(Continued)

*Primary Examiner* — An H Do
(74) *Attorney, Agent, or Firm* — Fish & Richardson P.C.

(57) ABSTRACT

A flow meter well tool includes a volumetric well flow meter to be positioned in a wellbore. The volumetric well flow meter includes a hollow cylindrical tubing to be positioned in the wellbore. The tubing splits well fluid through the wellbore into an internal fluid through the volumetric well flow meter and an external fluid through an annulus between the wellbore and the volumetric well flow meter. The hollow cylindrical tubing includes an internal portion, where an internal cross-sectional area of the internal portion is less than an internal cross-sectional area of the hollow cylindrical tubing.

10 Claims, 5 Drawing Sheets

(56) References Cited

U.S. PATENT DOCUMENTS

| | | |
|---|---|---|
| 6,860,325 B2 | 3/2005 | Ramakrishnan et al. |
| 6,935,189 B2 | 8/2005 | Richards |
| 7,086,294 B2 | 8/2006 | DeLong |
| 7,107,860 B2 | 9/2006 | Jones |
| 7,258,164 B2 | 8/2007 | Rezgui et al. |
| 7,707,897 B2 * | 5/2010 | Ong .................. G01F 1/36 73/861.04 |
| 8,342,238 B2 | 1/2013 | McCoy et al. |
| 8,464,582 B2 | 6/2013 | Roux et al. |
| 8,505,376 B2 | 8/2013 | Ross |
| 2002/0121371 A1 | 9/2002 | Moake |
| 2004/0031330 A1 | 2/2004 | Richards et al. |
| 2005/0173336 A1 | 8/2005 | Arnaud et al. |
| 2009/0266175 A1 | 10/2009 | Monmont |
| 2009/0277628 A1 | 11/2009 | Watson et al. |
| 2009/0293634 A1 | 12/2009 | Ong |
| 2010/0172773 A1 | 7/2010 | Watson et al. |
| 2010/0258303 A1 | 10/2010 | Alberty |
| 2010/0258304 A1 | 10/2010 | Hegeman |
| 2010/0326654 A1 | 12/2010 | Hemblade |
| 2013/0081460 A1 | 4/2013 | Xiao et al. |
| 2013/0138254 A1 | 5/2013 | Seals et al. |
| 2013/0199775 A1 | 8/2013 | Burleigh |
| 2014/0083683 A1 | 3/2014 | Tips |

FOREIGN PATENT DOCUMENTS

| | | |
|---|---|---|
| JP | 2007212465 | 8/2007 |
| WO | 2011/033257 | 3/2011 |
| WO | 2013/049574 | 4/2013 |

OTHER PUBLICATIONS

Notification of Reasons for Refusal issued in Japanese Application No. 2017-502698 dated Feb. 25, 2019, 14 pages.

International Search Report and Written Opinion of the International Searching Authority issued in International Application No. PCT/US2015/036377 dated Feb. 15, 2016; 14 pages—new art cited.

European Communication under Rule 71(3) EPC issued in European Application No. 15733965.6 dated Mar. 12, 2019, 30 pages.

Gulf Cooperation Council Examination Report issued in GCC Application GC 2015-29767, dated Oct. 27, 2020, 4 pages.

* cited by examiner

FLOW METER WELL TOOL

CROSS-REFERENCE TO RELATED APPLICATIONS

This application is a divisional application of and claims the benefit of priority to U.S. application Ser. No. 15/961,993, filed on Apr. 25, 2018, which in turn claims the benefit of priority to U.S. application Ser. No. 14/330,785, filed on Jul. 14, 2014, of which the contents of both applications are hereby incorporated by reference.

TECHNICAL FIELD

This disclosure relates to well flow meters in well systems, for example, in downhole well tools.

BACKGROUND

Well flow meters (e.g., volumetric and pressure based flow meters) are used in well systems, such as hydrocarbon-bearing wells, to measure flow rate of a fluid in the well system. An in-well flow meter includes a sensor to measure a fluid characteristic of the fluid in the well system. Sometimes, an in-well flow meter is placed on or is part of a well tool on either an outlet end or inlet end of a downhole pumping unit, for example, an electric submersible pump (ESP).

SUMMARY

This disclosure describes well flow meter systems and flow meter well tools to measure fluid characteristics, such as flow rate, fluid density, and flow restriction, of a fluid in a well.

Certain aspects encompass a flow meter well tool including a volumetric well flow meter to be positioned in a wellbore. The volumetric well flow meter includes a hollow cylindrical tubing to be positioned in the wellbore, the tubing to split well fluid through the wellbore into an internal fluid through the volumetric well flow meter and an external fluid through an annulus between the wellbore and the volumetric well flow meter. The hollow cylindrical tubing includes an internal portion, where an internal cross-sectional area of the internal portion is less than an internal cross-sectional area of the hollow cylindrical tubing.

The aspects above can include some, none, or all of the following features. The flow meter well tool includes a discharge grill component attached to an outlet end of the volumetric well flow meter, the discharge grill component to commingle the internal fluid and the external fluid that flow past the outlet end of the volumetric well flow meter. The discharge grill component includes a tubing attached to the hollow cylindrical tubing at the outlet end of the volumetric flow meter, the tubing including openings through which the internal fluid flows to commingle with the external fluid. An open area of the openings is greater than or equal to the internal cross-sectional area of the hollow cylindrical tubing of the volumetric flow meter. The discharge grill component includes a bull nose in the tubing. The flow meter well tool includes a measurement correction component attached to the discharge grill component, the measurement correction component to correct flow measurement errors introduced by tolerances of an inner diameter of the wellbore. An outer diameter of the volumetric well flow meter, an outer diameter of the discharge grill component, and an outer diameter of the measurement correction component are substantially equal to each other. A longitudinal length of the volumetric well flow meter is substantially the same as a longitudinal length of the measurement correction component. The flow meter well tool includes a flow conditioner at an inlet end of the volumetric well flow meter to homogenize the well fluid. The flow conditioner includes a conditioner tubing with a plurality of fins arranged to homogenize the well fluid, the conditioner tubing coupled to the hollow cylindrical tubing at the inlet end of the volumetric well flow meter. The volumetric well flow meter is positioned before an intake of a downhole pumping unit in the wellbore.

Certain aspects encompass a well flow meter system including a volumetric well flow meter positioned in a wellbore, the flow meter including a hollow cylindrical tubing to split well fluid through the wellbore into an internal fluid through the volumetric flow meter and an external fluid through an annulus between the wellbore and the volumetric well flow meter. The well flow meter system includes an internal sensor of the hollow cylindrical tubing to measure a pressure differential of the internal fluid, an external sensor of the hollow cylindrical tubing to measure a pressure differential of the external fluid, and processing circuitry connected to the internal sensor and the external sensor. The processing circuitry performs operations including receiving pressure signals from the internal sensor and the external sensor, determining pressure differentials across the internal fluid through the volumetric flow meter and across the external fluid through the annulus, and determining fluid characteristics of the well fluid based on the determined pressure differentials.

The aspects above can include some, none, or all of the following features. The hollow cylindrical tubing includes an internal portion, the internal portion having a cross-sectional area less than an internal cross-sectional area of the hollow cylindrical tubing. The well flow meter system includes a discharge grill component attached to an outlet end of the volumetric well flow meter, the discharge grill component to commingle the internal fluid and the external fluid that flow past the outlet end of the volumetric well flow meter, and a measurement correction component including a tubing section and a correction sensor to measure a pressure differential of the commingled internal and external fluid between the measurement correction component and the wellbore. The well flow meter system includes a transmitter electronically coupled to the internal sensor, the external sensor, and the correction sensor, and a receiver to receive differential pressure data from the internal sensor, the external sensor, and the correction sensor, the differential pressure data transmitted from a transmitter coupled to the internal sensor, the external sensor, and the correction sensor. The operations further include determining a pressure differential across the commingled internal fluid and external fluid flowing outside the correction sensor, where the fluid characteristics include a volumetric flow rate of the commingled fluid, a volumetric flow rate of the internal fluid, a volumetric flow rate of the external fluid, a fluid density, and a fluid flow path resistance. Determining the fluid characteristics of the well fluid includes solving the following equations:

$$Q_A = A_1 \sqrt{\frac{2\Delta P_{12}}{\rho\left[\left(\frac{A_1}{A_2}\right)^2 - 1\right]}}$$

$$Q = Q_A + Q_B$$

-continued $$\Delta P_{xy} = (R_B Q_B^2 + H_g)\rho g$$

$$\Delta P_{xy} = (R_A Q_A^2 + H_g)\rho g$$

$$\Delta P_{ij} = (R_B Q^2 + H_g)\rho g$$

where an internal cross-sectional area of the volumetric flow meter ($A_1$), the pressure differential of the internal fluid ($\Delta P_{12}$), smallest internal cross-sectional area of an internal portion of the volumetric flow meter ($A_2$), the pressure differential of the external fluid ($\Delta P_{xy}$), the pressure differential of the commingled fluid ($\Delta P_{ij}$), flow path resistance of the fluid through the volumetric flow meter ($R_A$), and vertical elevation change ($H_g$) are used to solve for volumetric flow rate of the commingled fluid (Q), volumetric flow rate of the internal fluid ($Q_A$), volumetric flow rate of the external fluid ($Q_B$), fluid density ($\rho$), and fluid flow path resistance ($R_B$).

Certain aspects encompass a method including separating fluid flowing through a wellbore into an internal fluid flowing internal to a volumetric well flow meter and an external fluid flowing external to the volumetric well flow meter, measuring differential pressures in the internal fluid and in the external fluid, and determining one or more fluid properties of the fluid flowing through the wellbore based, in part, on the measured differential pressures.

The aspects above can include some, none, or all of the following features. The method includes homogenizing the fluid flowing through the wellbore before separating the fluid flowing through the wellbore into the internal fluid and the external fluid. Measuring differential pressures in the internal fluid and in the external fluid includes using differential pressure sensors in the volumetric well flow meter. The method includes determining one of flow rate, fluid density, or flow path resistance of the fluid from the measured differential pressures of the internal fluid, external fluid, and combined fluid.

Certain aspects encompass a well flow meter system including a means for splitting well fluid through a wellbore into an internal fluid through a volumetric flow meter and an external fluid through an annulus between the wellbore and the volumetric flow meter. The well flow meter system includes a means for sensing a pressure differential of the internal fluid, a means for sensing a pressure differential of the external fluid, a means for receiving pressure signals of the internal fluid and the external fluid, a means for determining pressure differentials across the internal fluid through the volumetric flow meter and across the external fluid through the annulus, and a means for determining fluid characteristics of the well fluid based on the determined pressure differentials.

The aspects above can include some, none, or all of the following features. The well flow meter system includes a means for commingling the internal fluid and the external fluid that flow past an outlet end of the volumetric flow meter. The well flow meter system includes a means for correcting flow measurement errors introduced by tolerances of an inner diameter of the wellbore. The well flow meter system includes a means for homogenizing the well fluid. The well flow meter system includes a means for sensing a pressure differential of the commingled internal fluid and external fluid. The well flow meter system includes a means for transmitting differential pressure data of the well fluid, and a means for receiving the transmitted differential pressure data of the well fluid.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a flow meter well tool that measures fluid characteristics of a fluid in a well, for example, flow rate, fluid density, and flow restriction of the fluid flow. The flow meter well tool includes a volumetric well flow meter positioned in a wellbore that splits well fluid through the wellbore into an internal fluid internal to the volumetric well flow meter and an external fluid in an annulus between walls of the wellbore and the volumetric well flow meter. The volumetric well flow meter measures a fluid characteristic (e.g., pressure differential) of both the internal fluid and the external fluid. In some implementations, the flow meter well tool splits the fluid flow into multiple separate paths and measures differential pressures in each path, as described below. The volumetric well flow meter can be coupled to or part of another downhole well tool (e.g., downhole pumping unit) or implemented independently downhole to analyze a well fluid flow, for example, a hydrocarbon-containing fluid in a production well, a drilling mud fluid in a well being drilled, and/or other fluid flows in a well.

In some implementations, the flow meter well tool can provide continuous monitoring of well production, downhole pumping unit performance, scale formation, casing wear, and/or wellbore wear. A flow meter well tool allows for the calculation of flow rate, fluid density, and flow path resistance that is not dependent on an inner diameter of a wellbore, casing, or liner. A flow meter well tool can correct for measurement variances from uncertainty in the inner diameter of the wellbore wall or casing. A flow meter well tool can be integrated into a downhole gauge, or can be implemented independently of downhole gauges. In some implementations, a flow meter well tool does not require additional control and/or power lines that may interfere with other downhole gauges (e.g., a pumping unit) when placed between downhole gauges. In some implementations, a flow meter well tool allows for an assessment of fluid properties before the fluid is affected by a pumping unit.

Figure 1:
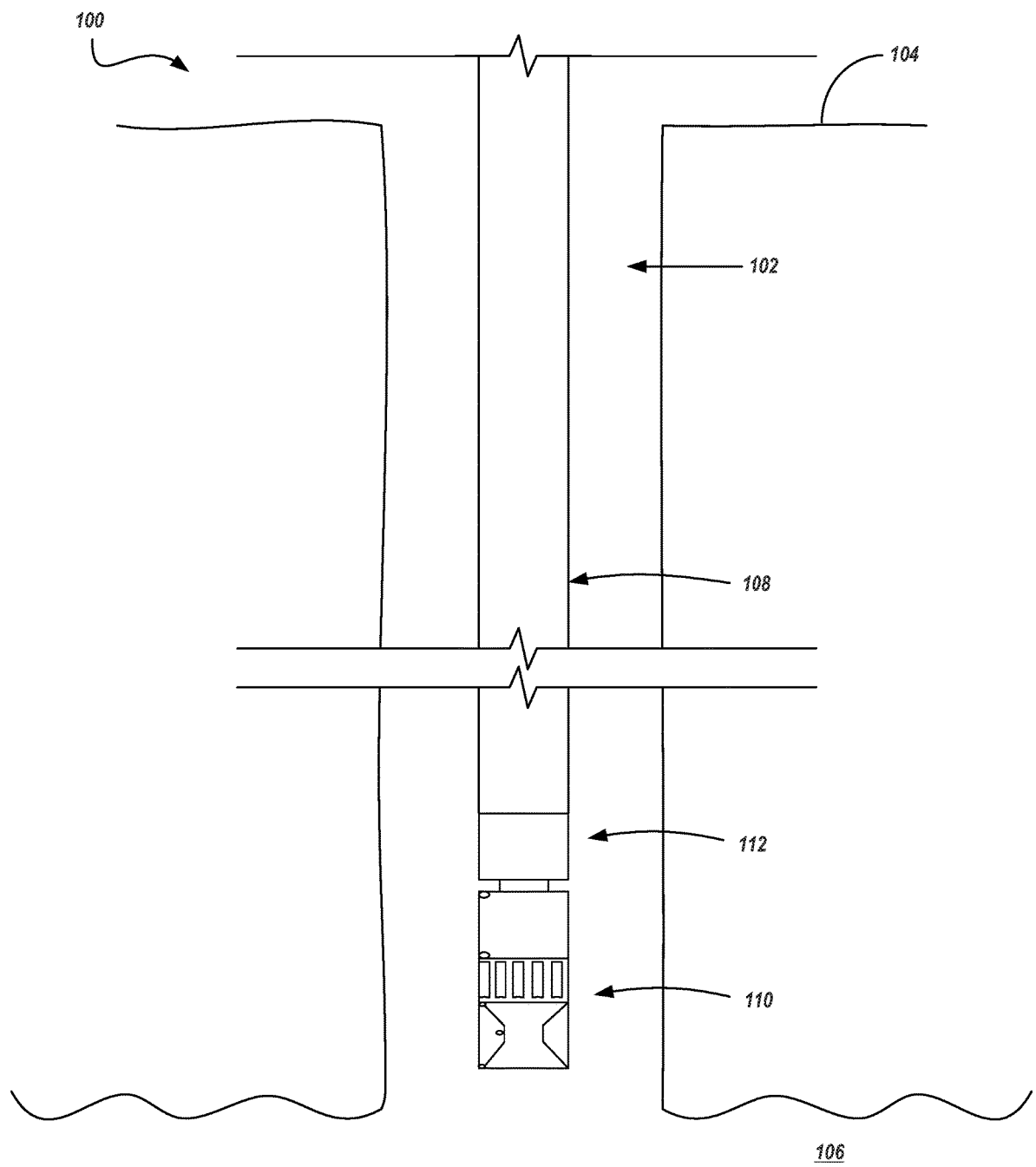
FIG. 1 is a schematic partial cross-sectional view of an example well system.

FIG. 1 is a schematic diagram of a well system 100 including a wellbore 102 that extends from a surface 104 downward into the Earth into one or more subterranean zones of interest 106 (one shown). A well string 108 is shown as having been lowered from the surface 104 into the wellbore 102. In some instances, the well string 108 is a series of jointed lengths of tubing coupled together end-to-end and/or a continuous (i.e., not jointed) coiled tubing. The well string 108 can make up a drill string, production string, or other well string used during the lifetime of a well system. The well string 108 includes a pumping unit 112 and a downhole assembly 110, for example, including a flow meter well tool. In some instances, the well string 108 does not include the pumping unit 112. In some implementations, such as depicted in FIG. 2, the well system 100 includes a liner (not shown) or casing 114 defined by lengths of tubing lining a portion of the wellbore 102 extending from the surface 104 into the Earth.

Figure 2:
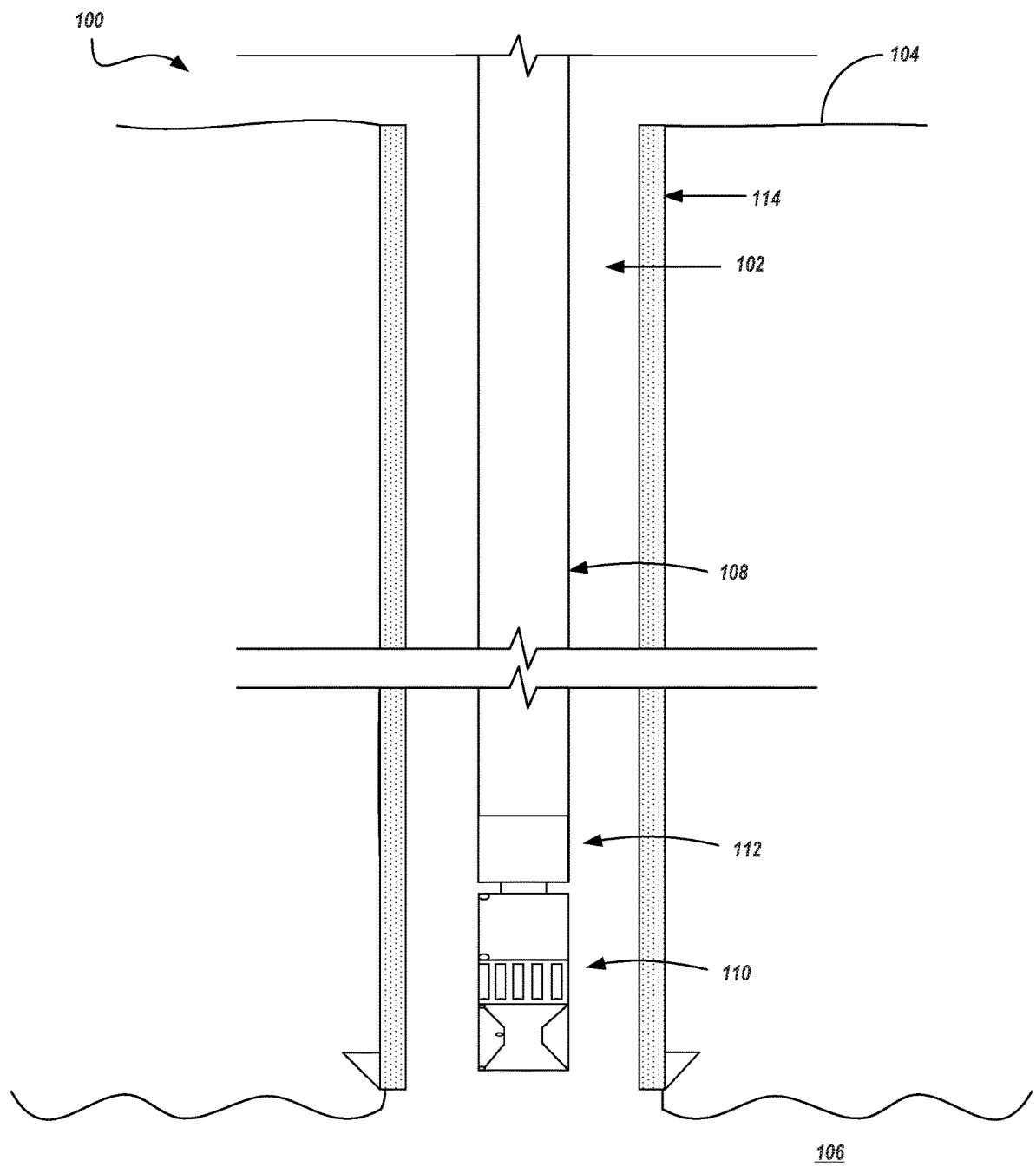
FIG. 2 is a schematic partial cross-sectional view of an example well system.
Figure 3:
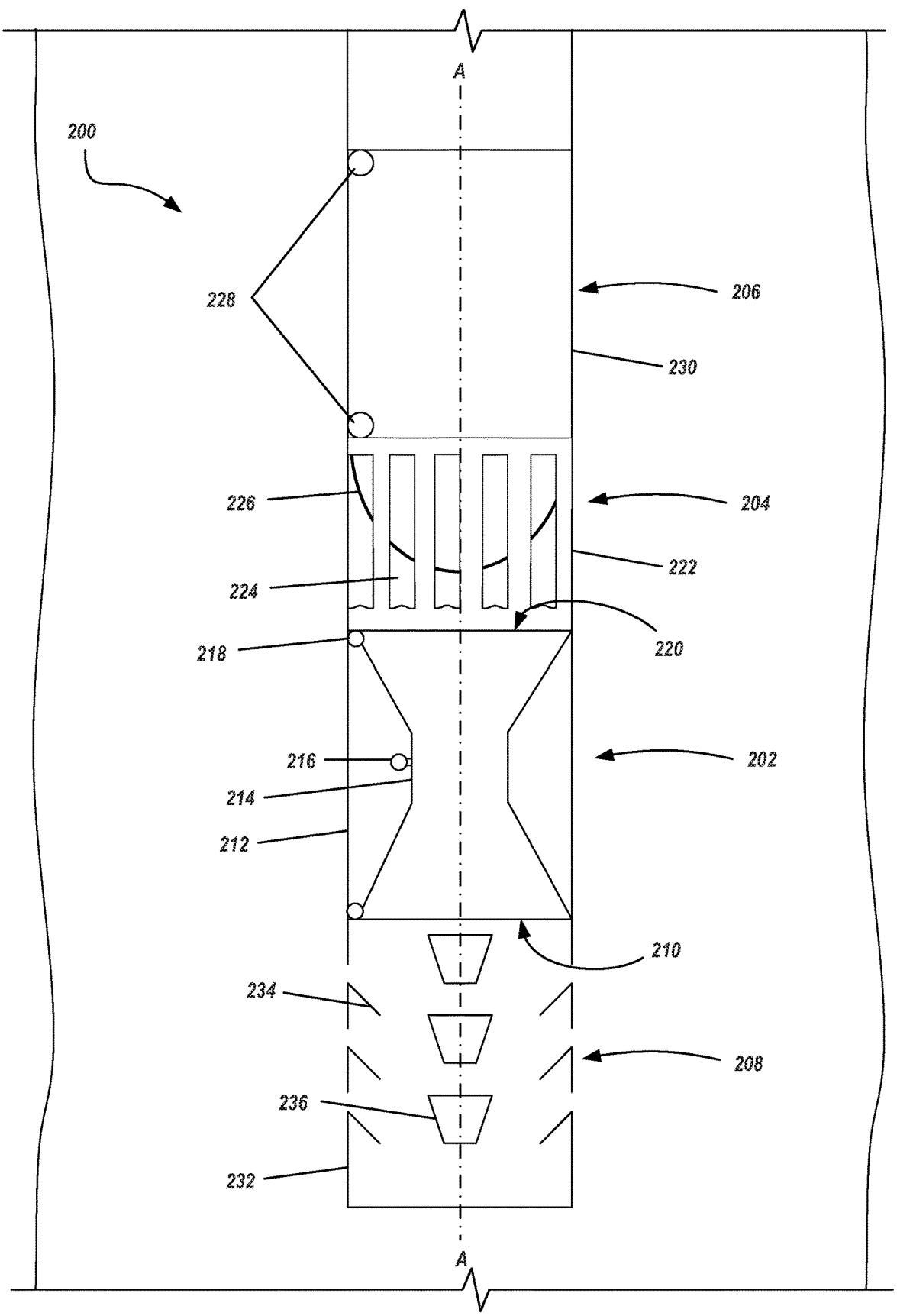
FIG. 3 is a schematic partial cross-sectional view of an example flow meter well tool.

As shown in FIG. 3, an example flow meter well tool 200 that can be used in the downhole assembly 110 of FIGS. 1 and 2 is shown in a cross-sectional side view. The example flow meter well tool 200 splits a fluid flow in a casing or wellbore (e.g., casing 114 or wellbore 102) of a well, and analyzes the split fluid flow to determine fluid flow characteristics including, e.g., a flow rate, fluid density, a flow path resistance of the split fluid flow, or other fluid flow characteristics. The example flow meter well tool 200 includes a volumetric well flow meter 202, a discharge grill component 204, a measurement correction component 206, and in some implementations, a flow conditioner 208. All or a portion of the fluid flow flows into an inlet end 210 of the volumetric well flow meter 202. The volumetric well flow meter 202 includes a hollow cylindrical tubing 212 to split the well fluid into an internal fluid through the volumetric well flow meter 202 and an external fluid through an annulus between the volumetric well flow meter 202 and the wellbore, casing, or liner. The external fluid flows alongside the volumetric well flow meter 202 in the annulus. The discharge grill component 204 receives the internal flow and commingles the internal and external fluid flows into a single, commingled fluid flow that flows alongside the measurement correction component 206.

The hollow cylindrical tubing 212 of the volumetric flow meter 202 includes an internal portion 214 with an internal cross-sectional area that is less than an internal cross-sectional area of the hollow cylindrical tubing 212. In some implementations, the volumetric well flow meter 202 includes an internal sensor 216 to measure a pressure differential in the internal fluid, and an external sensor 218 to measure a pressure differential in the external fluid. The volumetric well flow meter 202 can include additional and/or different sensors. In some implementations, the volumetric well flow meter 202 can be a venturi meter configured to measure differential pressures in the external and internal fluid flows. In certain implementations, the volumetric well flow meter 202 can be a turbine or orifice configured to measure differential pressures in the external and internal fluid flows.

The discharge grill component 204 attaches to an outlet end 220 of the volumetric well flow meter 202 and commingles the internal fluid and the external fluid that flow past the outlet end 220 of the volumetric well flow meter 202. The discharge grill component 204 includes a tubing 222 coupled to the hollow cylindrical tubing 212 at the outlet end 220 of the volumetric well flow meter 202. The tubing 222 of the discharge grill component 204 includes openings 224 through which the internal fluid flows to commingle with the external fluid in the annulus of the wellbore. The openings 224 can include, for example, grill slots, apertures, perforations, and/or other openings to allow the internal fluid to pass through the tubing 222 and merge with the external fluid in the annulus. The openings 224 have an open area greater than or equal to an interior cross-sectional area of the hollow cylindrical tubing 212 of the volumetric well flow meter 202, for example, to maintain a consistent flow area for the internal fluid passing through the openings 224. In some implementations, the discharge grill component 204 includes a bull nose 226 in the tubing 222 to bias the internal fluid to flow through the openings 224 in the tubing 222 and into the annulus. The bull nose 226 may be centered in a longitudinal end of the tubing 222 to direct the internal fluid flow through the openings 224 and out of the discharge grill component 204 and to minimize turbulence of the internal fluid through the discharge grill component 204. For example, the bull nose 226 may include a rounded or tapered shape in the tubing 222 of the discharge grill component 204 to redirect the internal fluid outwards through the openings 224 in the tubing 222 into the annulus.

The measurement correction component 206 connects to the discharge grill component 204 and corrects flow measurement errors introduced by tolerances of an inner diameter of the wellbore, casing, or lining. In some implementations, the measurement correction component 206 includes a correction sensor 228 and a tubing section 230 coupled to the tubing 222 of the discharge grill component 204. The correction sensor 228 measures a pressure differential in the commingled fluid flow in the annulus along a length of the measurement correction component 206. In some implementations, the measurement correction component 206 mounts to a downhole well tool on an upstream end of the fluid flow, for example, below the downhole well tool with a diameter the same as a diameter of the measurement correction component 206.

The flow conditioner 208 homogenizes the well fluid in the wellbore or casing at the inlet end 210 of the volumetric well flow meter 202. The flow conditioner 208 comprises conditioner tubing 232 with fins 234, baffles 236, and/or other homogenizing structures to promote homogenization of the well fluid. The conditioner tubing 232 couples to the hollow cylindrical tubing 212 at the inlet end 210 of the volumetric well flow meter 202. FIG. 3 shows the flow conditioner 208 coupled to the inlet end 210 of the volumetric well flow meter 202. However, in some implementations, the flow conditioner 208 is excluded in the flow meter well tool 200.

In some implementations, an outer diameter of the volumetric well flow meter 202, an outer diameter of the discharge grill component 204, and an outer diameter of the measurement correction component 206 are equal (substantially or exactly) to each other. The volumetric well flow meter 202, discharge grill component 204, and measurement correction component 206 can be longitudinally aligned, for example, along central axis A-A. In certain implementations, a longitudinal length of the volumetric well flow meter 202 along the central axis A-A is the same (substantially or exactly) as a longitudinal length of the measurement correction component 206 along the central axis A-A, for example, such that the external sensor 218 of the volumetric well flow meter 202 can measure a pressure differential over the same length as the correction sensor 228 of the measurement correction component 206. In some implementations, the longitudinal lengths of the volumetric flow meter 202 and the measurement correction component 206 can be different. The volumetric well flow meter 202 and the measurement correction component 206 can be made of the same or different material or materials.

The example flow meter well tool 200 can be implemented in a number of positions and configurations. In some implementations, the flow meter well tool 200 is positioned before an intake of a pumping unit (e.g., downhole ESP, drilling fluid pump, and/or other), with the outlet end 220 of the volumetric well flow meter 202 closer to the intake of the pumping unit than the inlet end 210 of the volumetric well flow meter 202. For example, the flow meter well tool 200 can analyze a well fluid flow performance before the well fluid is pumped through the pumping unit. In some examples, before an intake of the pumping unit includes below the pumping unit, such as when well fluid flows up a wellbore towards a well surface (e.g., production wells). In some examples, before an intake of the pumping unit includes above the pumping unit, such as when well fluid flows down a wellbore away from the well surface (e.g., wells being drilled). In other implementations, the flow meter well tool 200 is positioned after an outlet of a pumping unit. For example, the flow meter well tool 200 can analyze a well fluid flow performance after the well fluid is pumped through the pumping unit. In certain instances, analyzing the well fluid flow performance after the well fluid is pumped through the pumping unit with the flow meter well tool 200 may provide data on the performance and efficiency of the pumping unit. In some examples, after an outlet of the pumping unit includes above the pumping unit, such as when well fluid flows up a wellbore towards a well surface (e.g., production wells). In some examples, after an outlet of the pumping unit includes below the pumping unit, such as when fluid flows down a wellbore away from the well surface (e.g., wells being drilled). In further implementations, a flow meter well tool 200 is positioned in a wellbore as a standalone well tool, for example, excluding a pumping unit.

The flow meter well tool 200 can include additional or different components and features. For example, the example flow meter well tool 200 can include a centralizer at a longitudinal end of the flow meter well tool 200 to center the flow meter well tool 200 in a wellbore or casing. In another example, the flow meter well tool 200 can include a power source connected to the flow meter well tool 200, such as a turbine generator, battery, or another power source. A power source can supply power to the sensors 216, 218, and 228 on the volumetric well flow meter 202 and measurement correction component 206, and/or electronic systems associated with the flow meter well tool.

Figure 4:
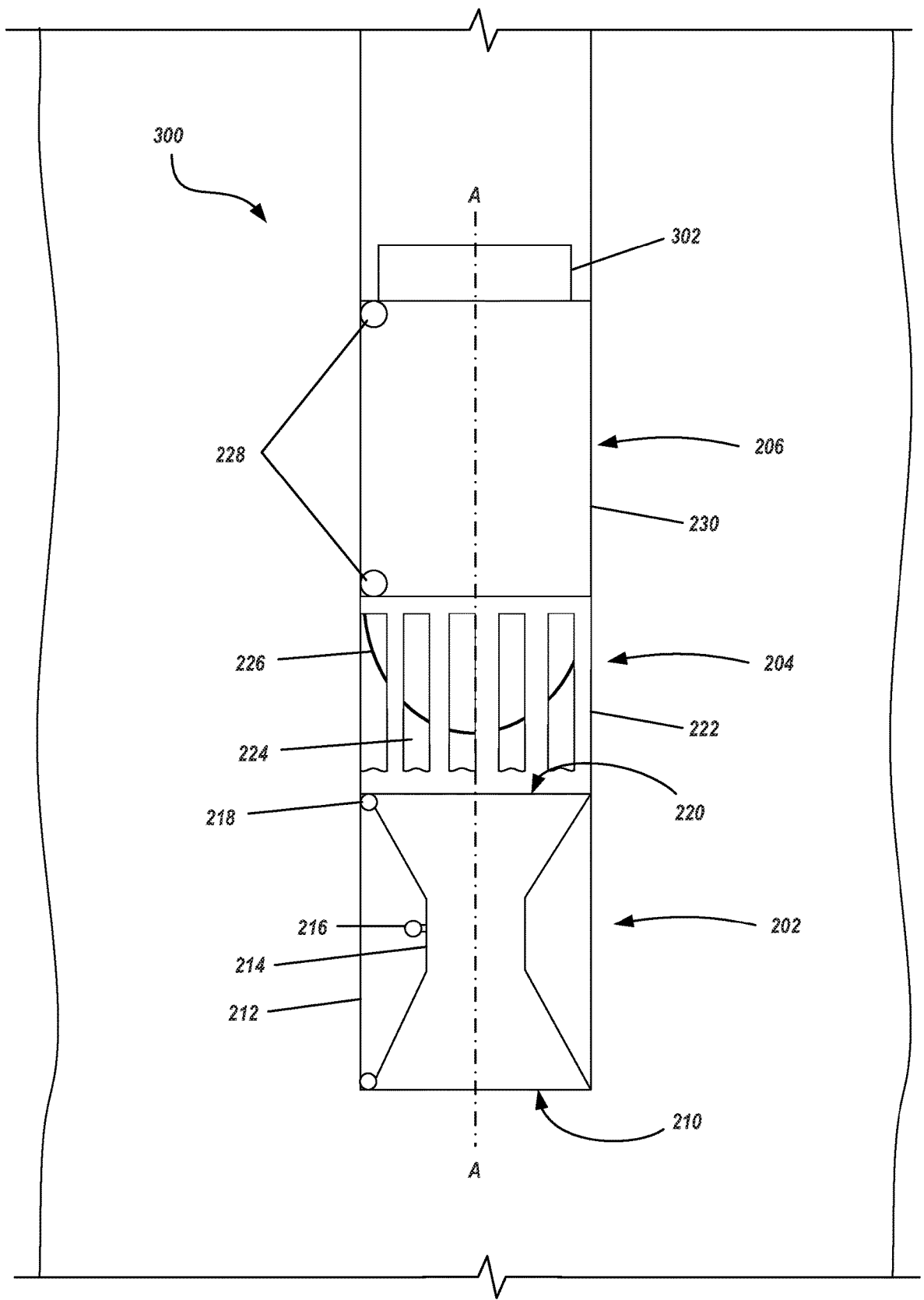
FIG. 4 is a schematic partial cross-sectional view of an example well flow meter system.

In some implementations, the downhole assembly 110 of FIGS. 1 and 2 includes one or more components of the flow meter well tool 200 of FIG. 3. For example, FIG. 4 shows an example well flow meter system 300 that includes some components of the flow meter well tool 200 of FIG. 3, including the volumetric well flow meter 202, the internal sensor 216, and the external sensor 218. The well flow meter system 300 also includes processing circuitry 302 connected to the internal sensor 216 and the external sensor 218 to determine pressure differential data from the internal sensor 216 and external sensor 218 and to determine one or more fluid characteristics based on the pressure differential data. FIG. 4 shows the processing circuitry 302 downhole with the flow meter well tool 200 in a well. In certain implementations, the processing circuitry 302 is located uphole of the flow meter well tool 200, for example, at the surface of the well, and connected to the internal sensor 216 and the external sensor 218 via a wired, wireless, a combination of wired and wireless connection, and/or another connection. In some implementations, the well flow meter system 300 includes a discharge grill component 204 and a measurement correction component 206, including a correction sensor 228 of the measurement correction component 206. The processing circuitry 302 can assess pressure differential data from the correction sensor 228 in addition to pressure differential data from the internal sensor 216 and external sensor 218. In certain implementations, the well flow meter system 300 includes a computer readable storage medium storing instructions executable by one or more processors as an alternative to or in addition to the processing circuitry 302.

In some implementations, the processing circuitry 302 connects to a transmitter electronically coupled to the internal sensor 216, the external sensor 218, and the correction sensor 228, and a receiver configured to receive differential pressures from the transmitter. In some examples, the transmitter is mounted on the volumetric flow meter 202, measurement correction component 206, and/or another component, and the receiver is located at a surface of the respective well. In some implementations, the processing circuitry 302 comprises a processor to assess data and calculate the fluid characteristics based on the pressure differentials. The fluid characteristics that the processing circuitry 302 determines can vary. In some examples, the fluid characteristics include one or more of a volumetric flow rate (Q) of the commingled fluid, a volumetric flow rate ($Q_A$) of the internal fluid, a volumetric flow rate ($Q_B$) of the external fluid, a fluid density ($\rho$), and a fluid flow path resistance ($R_B$). The fluid characteristics can be determined from the differential pressures determined from the sensors of the well flow meter system 300. In certain instances, the following set of equations are used to solve for the fluid characteristics:

$$Q_A = A_1 \sqrt{\frac{2\Delta P_{12}}{\rho\left[\left(\frac{A_1}{A_2}\right)^2 - 1\right]}} \quad (1)$$

$$Q = Q_A + Q_B \quad (2)$$

$$\Delta P_{xy} = (R_B Q_B^2 + H_g)\rho g \quad (3)$$

$$\Delta P_{xy} = (R_A Q_A^2 + H_g)\rho g \quad (4)$$

$$\Delta P_{ij} = (R_B Q^2 + H_g)\rho g \quad (5)$$

The set of equations define a solvable set of five equations with 5 unknowns, where the five unknowns are Q, $Q_A$, $Q_B$, $\rho$, and $R_B$, as described above. The variables in the above equations are defined in Table 1, below. The fluid characteristics can be determined by the processing circuitry 302 from the equations.

TABLE 1

| Variable | Definition |
|---|---|
| Q | volumetric flow rate of commingled fluid |
| $Q_A$ | volumetric flow rate of internal fluid |
| $Q_B$ | volumetric flow rate of external fluid |
| $A_1$ | internal cross-sectional area of volumetric well flow meter |
| $A_2$ | internal cross-sectional area of internal portion of volumetric well flow meter |
| $\Delta P_{12}$ | pressure differential in the volumetric well flow meter from the internal sensor, from the inlet end to the internal portion |
| $\rho$ | fluid density |
| $R_A$ | fluid flow path resistance of the fluid through the volumetric flow meter |
| $R_B$ | fluid flow path resistance of the annulus at the volumetric well flow meter |
| $H_g$ | vertical elevation change of the external sensor, and/or of the correction sensor |
| $\Delta P_{xy}$ | pressure differential from the external sensor, from the inlet end to the outlet end of the volumetric well flow meter |

TABLE 1-continued

| Variable | Definition |
| --- | --- |
| $\Delta P_{ij}$ | pressure differential from the correction sensor, from one end of the measurement correction component to another end |

Figure 5:
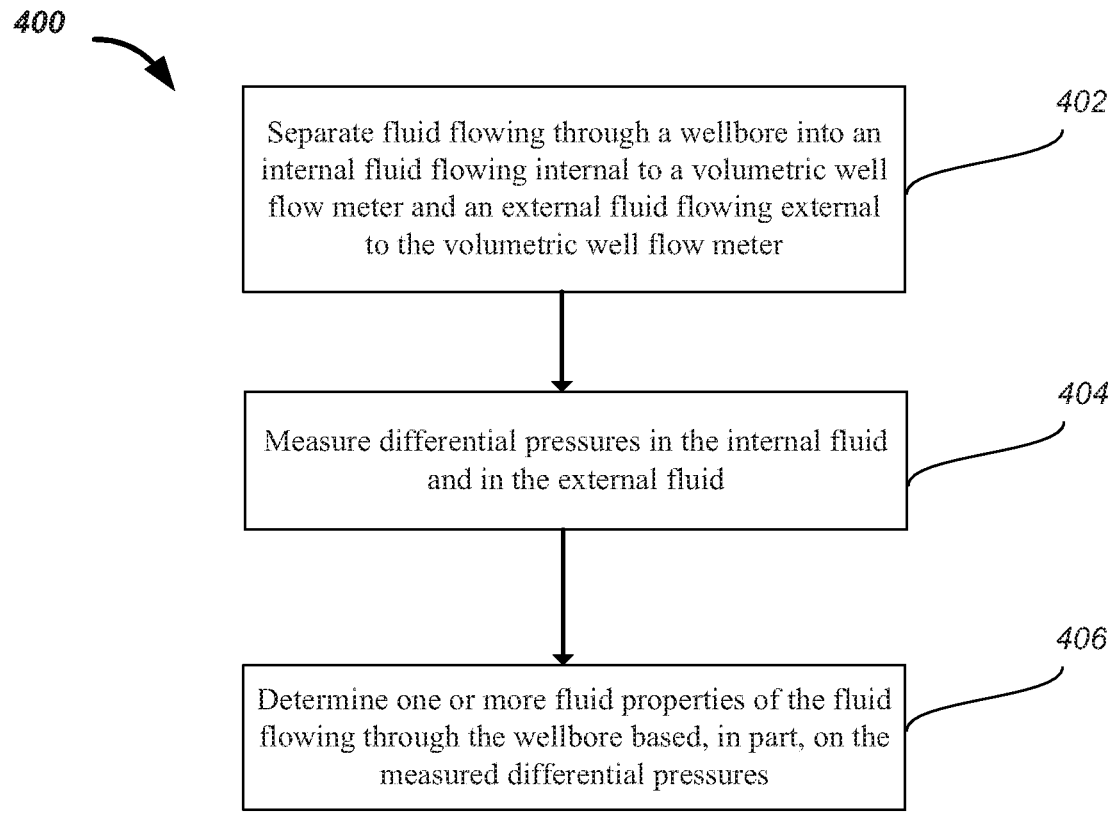
FIG. 5 is a flowchart describing a method for analyzing a fluid flow in a well.

FIG. 5 is a flow chart describing a method 400 of analyzing a fluid in a well, for example, performed by the example well flow meter tool described above. At 402, a fluid flowing through a wellbore is separated into an internal fluid flowing internal to a volumetric well flow meter and an external fluid flowing external to the volumetric well flow meter. At 404, differential pressures are measured in the internal fluid and in the external fluid. At 406, one or more fluid properties of the fluid flowing through the wellbore are determined based, in part, on the measured differential pressures. In some examples, processing circuitry can implement the method 400, specifically step 406 of determining one or more fluid properties of the fluid flowing through the wellbore. The processing circuitry can be implemented uphole, downhole, or at a remote location away from a respective well site.

A number of implementations have been described. Nevertheless, it will be understood that various modifications may be made without departing from the spirit and scope of the disclosure.

What is claimed is:

1. A flow meter well tool comprising:
   a volumetric well flow meter to be positioned in a wellbore, the volumetric well flow meter comprising:
      a hollow cylindrical tubing to be positioned in the wellbore, the tubing to split well fluid through the wellbore into an internal fluid through the volumetric well flow meter and an external fluid through an annulus between the wellbore and the volumetric well flow meter, the hollow cylindrical tubing comprising an internal portion, wherein an internal cross-sectional area of the internal portion is less than an internal cross-sectional area of the hollow cylindrical tubing; and
   a discharge grill component attached to an outlet end of the volumetric well flow meter, the discharge grill component configured to commingle the internal fluid and the external fluid that flow past the outlet end of the volumetric well flow meter.

2. The flow meter well tool of claim 1, wherein the discharge grill component comprises a tubing attached to the hollow cylindrical tubing at the outlet end of the volumetric flow meter, the tubing comprising openings through which the internal fluid flows to commingle with the external fluid.

3. The flow meter well tool of claim 2, where an open area of the openings is greater than or equal to the internal cross-sectional area of the hollow cylindrical tubing of the volumetric flow meter.

4. The flow meter well tool of claim 2, wherein the discharge grill component further comprises a bull nose in the tubing.

5. The flow meter well tool of claim 1, further comprising a measurement correction component attached to the discharge grill component, the measurement correction component to correct flow measurement errors introduced by tolerances of an inner diameter of the wellbore.

6. The flow meter well tool of claim 5, wherein an outer diameter of the volumetric well flow meter, an outer diameter of the discharge grill component, and an outer diameter of the measurement correction component are substantially equal to each other.

7. The flow meter well tool of claim 5, wherein a longitudinal length of the volumetric well flow meter is substantially the same as a longitudinal length of the measurement correction component.

8. The flow meter well tool of claim 1, further comprising a flow conditioner at an inlet end of the volumetric well flow meter to homogenize the well fluid.

9. The flow meter well tool of claim 8, wherein the flow conditioner comprises a conditioner tubing with a plurality of fins arranged to homogenize the well fluid, the conditioner tubing coupled to the hollow cylindrical tubing at the inlet end of the volumetric well flow meter.

10. The flow meter well tool of claim 1, wherein the volumetric well flow meter is positioned before an intake of a downhole pumping unit in the wellbore.

\* \* \* \* \*